(12) United States Patent
Zou et al.

(10) Patent No.: US 11,380,995 B2
(45) Date of Patent: Jul. 5, 2022

(54) TWO-DIMENSIONAL ANTENNA SYSTEM AND METHOD AND DEVICE FOR POSITIONING A TARGET

(71) Applicant: SZ DJI TECHNOLOGY CO., LTD., Shenzhen (CN)

(72) Inventors: Xiaying Zou, Shenzhen (CN); Xueming Peng, Shenzhen (CN); Qiang Gu, Shenzhen (CN); Han Huang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 405 days.

(21) Appl. No.: 16/517,248

(22) Filed: Jul. 19, 2019

(65) Prior Publication Data
US 2019/0341694 A1 Nov. 7, 2019

Related U.S. Application Data

(63) Continuation of application No. PCT/CN2017/072052, filed on Jan. 22, 2017.

(51) Int. Cl.
*H01Q 9/04* (2006.01)
*H01Q 1/28* (2006.01)
(Continued)

(52) U.S. Cl.
CPC ........... *H01Q 9/0428* (2013.01); *G01S 13/06* (2013.01); *G01S 13/42* (2013.01); *G01S 13/933* (2020.01);
(Continued)

(58) Field of Classification Search
CPC .. H01Q 21/00; H01Q 21/0031; H01Q 21/061; H01Q 21/0075; H01Q 21/24;
(Continued)

(56) References Cited

U.S. PATENT DOCUMENTS

| | | | | |
|---|---|---|---|---|
| 4,811,020 A | * | 3/1989 | Montheil | G01S 7/025 342/149 |
| 10,852,418 B2 | * | 12/2020 | Wodrich | G01S 13/931 |
| 2016/0282450 A1 | | 9/2016 | Kishigami et al. | |

FOREIGN PATENT DOCUMENTS

| CN | 1808177 A | 7/2006 |
|---|---|---|
| CN | 101145251 A | 3/2008 |

(Continued)

OTHER PUBLICATIONS

World Intellectual Property Organization (WIPO) International Search Report for PCT/CN2017/072052 dated Oct. 23, 2017 5 pages.

*Primary Examiner* — Vladimir Magloire
*Assistant Examiner* — Oladimeji Oyegunle
(74) *Attorney, Agent, or Firm* — Anova Law Group, PLLC

(57) ABSTRACT

The present disclosure provides a two-dimensional antenna system. The two-dimensional antenna system includes a transmitting antenna array and a receiving antenna array. The transmitting antenna array includes one or more circularly polarized transmitting antennas having a first direction of rotation. The receiving antenna array includes two or more first circularly polarized receiving antennas having a second direction of rotation arranged in a first direction, and two or more second circularly polarized receiving antennas having the second direction of rotation arranged in a second direction. The first direction is perpendicular to the second direction, and the first direction of rotation is opposite to the second direction of rotation.

20 Claims, 8 Drawing Sheets

(51) Int. Cl.
*H01Q 3/36* (2006.01)
*H01Q 21/00* (2006.01)
*H01Q 21/24* (2006.01)
*G01S 13/06* (2006.01)
*G01S 13/933* (2020.01)
*G01S 13/42* (2006.01)
*H01Q 21/06* (2006.01)

(52) U.S. Cl.
CPC .................. *H01Q 1/28* (2013.01); *H01Q 3/36* (2013.01); *H01Q 21/0031* (2013.01); *H01Q 21/065* (2013.01); *H01Q 21/24* (2013.01)

(58) Field of Classification Search
CPC .......... H01Q 21/28; H01Q 1/28; H01Q 1/285; H01Q 25/001; H01Q 9/0428; G01S 13/06; G01S 13/42; G01S 13/933
See application file for complete search history.

(56) References Cited

FOREIGN PATENT DOCUMENTS

| | | |
|---|---|---|
| CN | 103247858 A | 8/2013 |
| CN | 104280719 A | 1/2015 |
| CN | 105988107 A | 10/2016 |
| CN | 106019240 A | 10/2016 |

\* cited by examiner

TWO-DIMENSIONAL ANTENNA SYSTEM AND METHOD AND DEVICE FOR POSITIONING A TARGET

CROSS-REFERENCE TO RELATED APPLICATION

This application is a continuation application of International Application No. PCT/CN2017/072052, filed on Jan. 22, 2017, the entire contents of which are incorporated herein by reference.

TECHNICAL FIELD

The present disclosure relates to the field of microwave technology, more specifically, to a two-dimensional antenna system, and a method and device for positioning a target.

BACKGROUND

With the development of flight technology, aircrafts, such as Unmanned Aerial Vehicles (UAVs), also known as drones and unmanned aircraft, have evolved from military use to more and more civilian applications, such as UAV plant protection, UAV aerial photography, UAV forest fire monitoring, etc. Civilian applications are the future development trend for the UAVs.

However, the current radar systems are mostly used in large equipment. There are several methods for large equipment to implement two-dimensional scanning using a radar system. The first method is to install a rotatable platform on the yaw direction, an antenna may be driven by the platform to perform mechanical scanning, and a phased array antenna may be used for scanning on the pitch direction. The second method is to install a rotatable platform in both the yaw and the pitch directions, and the antenna may be driven by the platform to perform mechanical scanning. The third method is to use a plurality of antennas, transmission modules, receiving modules, and a phased array antenna to perform the scanning. The first two methods have a more complex structure as they use mechanical means for two-dimensional scanning and the rotatable platform requires a motor to drive the movement. Therefore, the first two methods are not suitable for small equipment such as the UAVs. The third method requires multiple transmission modules and receiving modules, which also increases the hardware cost and complexity.

SUMMARY

The present disclosure provides a two-dimensional antenna system, and a method and device for positioning a target to be used on an aircraft with a simple structure and low cost, and may realize two-dimensional detection of the yaw angle and the pitch angle of the target. The present disclosure provides a simple and low-cost antenna design for the obstacle avoidance function of UAVs, especially an antenna design used for two-dimensional obstacle avoidance.

One aspect of the present disclosure provides a two-dimensional antenna system. The two-dimensional antenna system includes a transmitting antenna array and a receiving antenna array. The transmitting antenna array includes one or more circularly polarized transmitting antennas having a first direction of rotation. The receiving antenna array includes two or more first circularly polarized receiving antennas having a second direction of rotation arranged in a first direction, and two or more second circularly polarized receiving antennas having the second direction of rotation arranged in a second direction. The first direction is perpendicular to the second direction, and the first direction of rotation is opposite to the second direction of rotation.

Another aspect of the present disclosure provides a method of positioning a target. The method includes transmitting a detection wave by using one or more circularly polarized transmitting antennas having a first direction of rotation; receiving two or more beams of a first echo of the detection wave by using two or more first circularly polarized receiving antennas having a second direction of rotation arranged in a first direction; and receiving two or more beams of a second echo of the detection wave by using two or more second circularly polarized receiving antennas having the second direction of rotation arranged in a second direction. The first direction is perpendicular to the second direction, and the first direction of rotation is opposite to the second direction of rotation.

The method further includes determining a pitch angle of the target based on a phase difference between the two or more beams of the first echo and a distance between the two or more first circularly polarized receiving antennas; and determining a yaw angle of the target based on a phase difference between the two or more beams of the second echo and a distance between the two or more second circularly polarized receiving antennas.

Another aspect of the present disclosure provides a device for positioning a target. The device includes a transmitting antenna array, a receiving antenna array, and one or more processors. The transmitting antenna array includes one or more circularly polarized transmitting antennas having a first direction of rotation for transmitting a detection wave. The receiving antenna array includes two or more first circularly polarized receiving antennas, the two or more first circularly polarized receiving antennas are antennas having a second direction of rotation arranged in a first direction for receiving two or more beams of a first echo of the detection wave; and two or more second circularly polarized receiving antennas, the two or more second circularly polarized receiving antennas are antennas having the second direction of rotation arranged in a second direction for receiving two or more beams of a second echo of the detection wave. The first direction is perpendicular to the second direction, and the first direction of rotation is opposite to the second direction of rotation.

Further, the one or more processors are configured to determine a pitch angle of the target based on a phase difference between the two or more beams of the first echo and a distance between the two or more first circularly polarized receiving antennas, and determine a yaw angle of the target based on a phase difference between the two or more beams of the second echo and a distance between the two or more second circularly polarized receiving antennas.

DETAILED DESCRIPTION OF THE EMBODIMENTS

The technical solutions in the embodiments of the present disclosure will be described below with reference to the accompanying drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Figure 1:
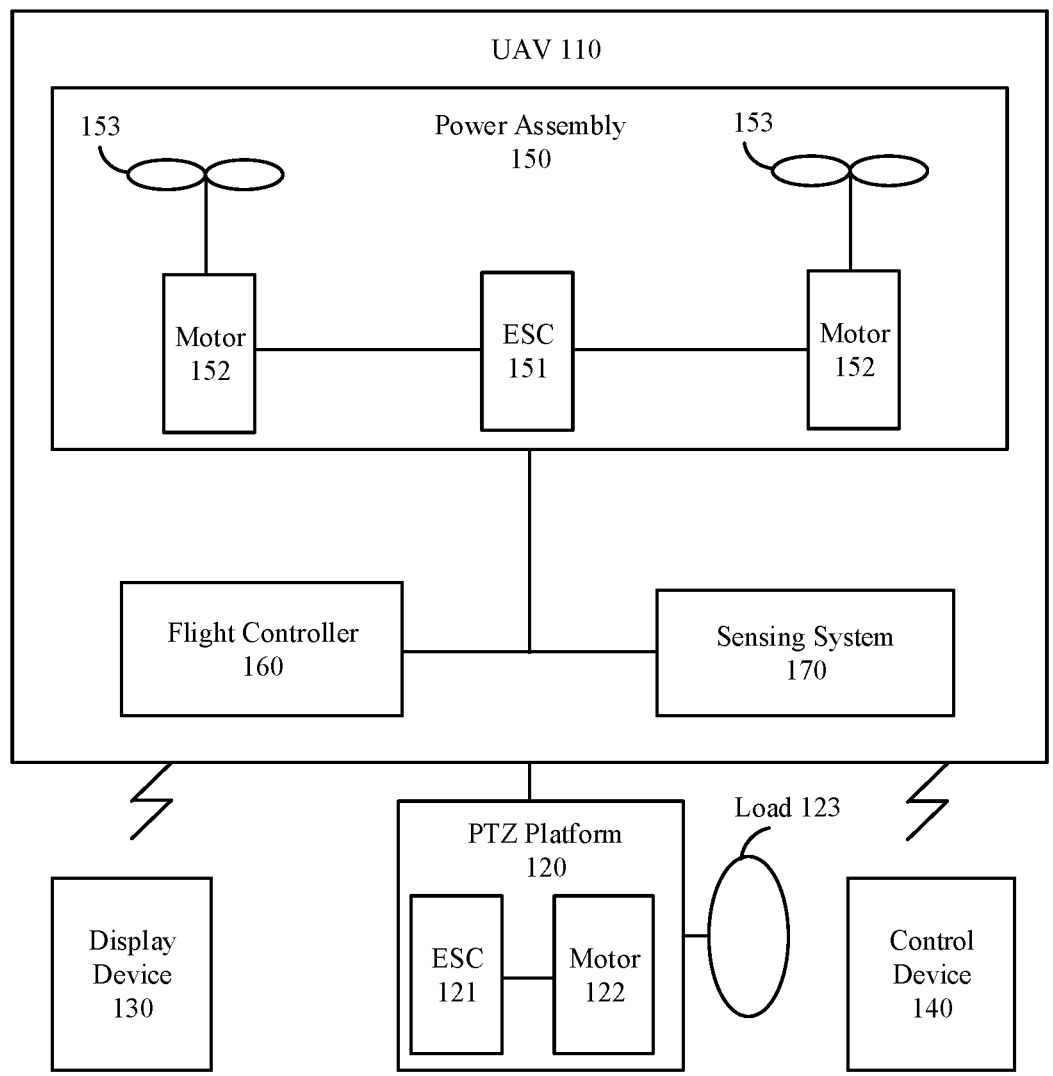
FIG. 1 is a schematic architectural diagram of an unmanned flight system according to an embodiment of the present disclosure.

First, a brief introduction to an unmanned flight system is provided. FIG. 1 is a schematic architectural diagram of an unmanned flight system 100 according to an embodiment of the present disclosure. The present embodiment is described by taking a rotorcraft as an example.

The unmanned flight system 100 may include an UAV 110, a Pan-Tilt-Zoom (PTZ) platform 120, a display device 130, and a control device 140. In particular, the UAV 110 may include a power assembly 150, a flight controller 160, and a sensing system 170. The UAV may communicate wirelessly with the control device 140 and the display device 130.

The UAV may include a frame that may include a body and a stand (also known as a landing gear). The body may include a main frame and one or more arms connected to the main frame, the one or more arms may extend radially from the main frame. The stand may be attached to the body for supporting the landing of the UAV 110.

The power assembly 150 may include an Electronic Speed Controller (ESC) 151, one or more rotors 153, and one or more motors 152 corresponding to the one or more rotors 153. The motor 152 may be connected between the ESC 151 and the rotor 153, and the motor 152 and the rotor 153 may be disposed on the corresponding arm. The ESC 151 may be used to receive a drive signal generated by the flight controller 160 and provide a drive current to the motor 152 based on the drive signal to control the rotational speed of the motor 152. Motor 152 may be used to drive the rotation of the rotor to power the flight of the UAV 110, which allows the UAV 110 to achieve one or more degrees of freedom of motion. In some embodiments, the UAV 110 may be rotated about one or more rotating axes. For example, the rotating axes mentioned above may include a roll axis, a yaw axis, and a pitch axis. It should be understood that the motor 152 may be a DC motor or an AC motor. In addition, the motor 152 may be a brushless motor or a brush motor.

The sensing system 170 may be used to measure the attitude information of the UAV, that is, the position information and state information of the UAV 110 in space. For example, a three-dimensional position, a three-dimensional angle, a three-dimensional velocity, a three-dimensional acceleration, and a three-dimensional angular velocity. The sensing system 170 may include, for example, one or more of a gyroscope, an electronic compass, an Inertial Measurement Unit (IMU), a vision sensor, a Global Positioning System (GPS), and a barometer.

The flight controller 160 may be used to control the flight of the UAV 110, for example, the flight of the UAV 110 may be controlled based on the attitude information measured by the sensing system 170. It should be understood that flight controller 160 may control the UAV 110 based on pre-programmed computer executable instructions, or in response to one or more control commands from control device 140.

The PTZ platform 120 may include an ESC 121 and a motor 122 and the PTZ platform 120 may be used to carry a load 123. For example, the load 123 may include a camera module (e.g., a camera module, a video camera module, etc.), the embodiments of the present disclosure are not limited thereto, for example, the PTZ platform may also be used to carry a weapon or other loads. The flight controller 160 may control the motion of the PTZ platform 120 through the ESC 121 and the motor 122. In another embodiment, the PTZ platform 120 may also include a control module for controlling the motion of the PTZ platform 120 by controlling the ESC 121 and the motor 122. It should be understood that the PTZ platform 120 may be independent of the UAV 110 or may be a part of the UAV 110. It should be understood that the motor 122 may be a DC motor or an AC motor. In addition, the motor 122 may be a brushless motor or a brush motor. It should also be understood that the PTZ platform may be located at the top of the aircraft or at the bottom of the aircraft.

The display device 130 may be located at a ground end of the unmanned flight system 100 and may communicate with the UAV 110 wirelessly and to display the attitude information of the UAV 110. In addition, when the load 123 is an image capturing device, an image captured by the image capturing device may also be displayed on the display device 130. It should be understood that display device 130 may be a standalone device or may be disposed in the control device 140.

The control device 140 may be located at the ground end of the unmanned flight system 100 and may communicate with the UAV 110 wirelessly to remotely control the UAV 110. The control device may be, for example, a remote controller or a terminal device with an application (APP) installed thereon to control the UAV, such as a smartphone, a tablet, or the like. In one embodiment, receiving a user input through the control device may refer to controlling the UAV through an input device such as a pull wheel, a button, a rocker, or a User Interface (UI) on the terminal device.

It should be understood that the above-mentioned nomenclature of the components of the unmanned flight system is for the purpose of identification only and is not to be construed as limiting the embodiments of the disclosure.

Figure 2:
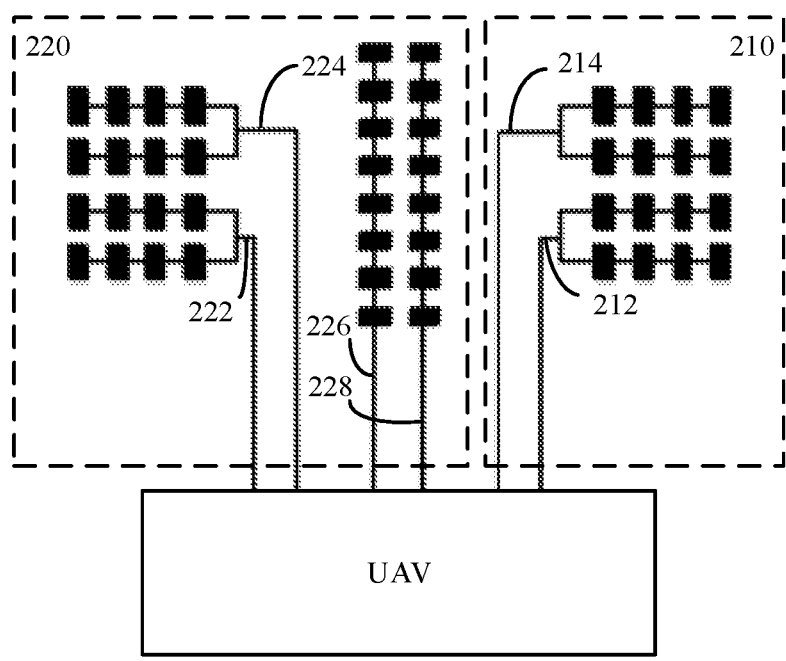
FIG. 2 is a schematic diagram of a two-dimensional antenna system according to an embodiment of the present disclosure.

An embodiment of the present disclosure provides a two-dimensional antenna system that may be used on an aircraft, particularly on an UAV. The two-dimensional antenna system may be disposed at the top of the aircraft (e.g., at the top of the UAV 110) or elsewhere for positioning the aircraft. FIG. 2 is a schematic diagram of a two-dimensional antenna system 200 according to an embodiment of the present disclosure.

As shown in FIG. 2, the two-dimensional antenna system 200 may include a transmitting antenna array 210 and a receiving antenna array 220. The transmitting antenna array 210 may include one or more circularly polarized transmitting antennas with a first direction of rotation. The receiving antenna array 220 may include two or more first circularly polarized receiving antennas with a second direction of rotation arranged in a first direction and two or more second circularly polarized receiving antennas with the second direction of rotation arranged in a second direction. In particular, the first direction may be perpendicular to the second direction, and the first direction of rotation may be opposite to the second direction of rotation.

The two-dimensional antenna system provided in the embodiments of the present disclosure has a simple structure and low cost, and may be applied to an aircraft. By designing the circularly polarized receiving antennas arranged vertically with each other, two-dimensional detection of the yaw and pitch angles of the target may be realized and reference information for the obstacle avoidance of the aircraft may be provided.

In the two-dimensional antenna system of the embodiment of the present disclosure, the transmitting antenna array 210 may be used to transmit a detection wave, and the detection wave may generate an echo after being reflected by the target. Since the electromagnetic wave transmitted by the circularly polarized transmitting antenna has a direction of rotation, the rotation direction of the electromagnetic wave may be reversed after a single reflection of the target, and it may be necessary to use a circularly polarized receiving antenna with an opposite rotation direction for reception. Therefore, the embodiment of the present disclosure utilizes the characteristics of the circularly polarized antenna mentioned above, such that the transmitting antenna and the receiving antenna may have opposite directions of rotation, which may increase the isolation between the antennas, and may effectively improve the signal-to-noise ratio of the received echo signal.

More specifically, in one embodiment, the first direction of rotation may be a left-handed rotation and the second direction of rotation may be a right-handed rotation; or, in another embodiment, the first direction of rotation may be a right-handed rotation and the second direction of rotation may be a left-handed rotation.

When an aircraft is in flight, the aircraft may be travelling at a high speed with frequent changes in the attitude. To adapt to the changes in the attitude of the aircraft, in one embodiment, the transmitting antenna array 210 may include two or more circularly polarized transmitting antennas. The two or more circularly polarized transmitting antennas may be arranged in the first direction for adjusting the direction of the detection wave transmitted by the circularly polarized transmitting antennas in the first direction. In addition, it may also be possible to control a beam direction of the detection wave by adjusting an excitation phase of each antenna (or it may be referred to as an antenna unit) to suit the attitude of the aircraft.

In one embodiment, the first direction may be a vertical direction and the second direction may be a horizontal direction. The two or more circularly polarized transmitting antennas may be arranged in the vertical direction for adjusting the direction of the detection wave transmitted by the circularly polarized transmitting antennas in the vertical direction. It should be understood that the vertical direction may be an approximate direction of gravity, especially when the aircraft is flying horizontally, the arrangement direction of the two or more first circularly polarized receiving antennas may be the approximate direction of gravity.

In the specific embodiment illustrated in FIG. 2, the transmitting antenna array 210 may include two circularly polarized transmitting antennas of a circularly polarized transmitting antenna 212 and a circularly polarized transmitting antenna 214 arranged in the vertical direction. The receiving antenna array 220 may include two first circularly polarized receiving antennas of a first circularly polarized receiving antenna 222 and a first circularly polarized receiving antenna 224 arranged in the vertical direction. The receiving antenna array 220 may include two second circularly polarized receiving antennas of a second circularly polarized receiving antenna 226 and a second circularly polarized receiving antenna 228 arranged in the horizontal direction.

It should be understood that the number of the circularly polarized transmitting antennas, first circularly polarized receiving antennas, and second circularly polarized receiving antennas of FIG. 2 is merely for illustrative purpose. The number of the circularly polarized transmitting antenna may be one or more than two, and the number of the first circularly polarized receiving antenna and the second circularly polarized receiving antenna may each be more than two, which are not limited in the embodiments of the present disclosure.

It should also be understood that the specific structure of each antenna may be determined based on the scanning range and the power. The specific structures of the antenna are not limited in the embodiments of the present disclosure.

The use of the two-dimensional antenna system 200 to position a target will be described in detail below in a method for positioning a target 300.

Figure 3:
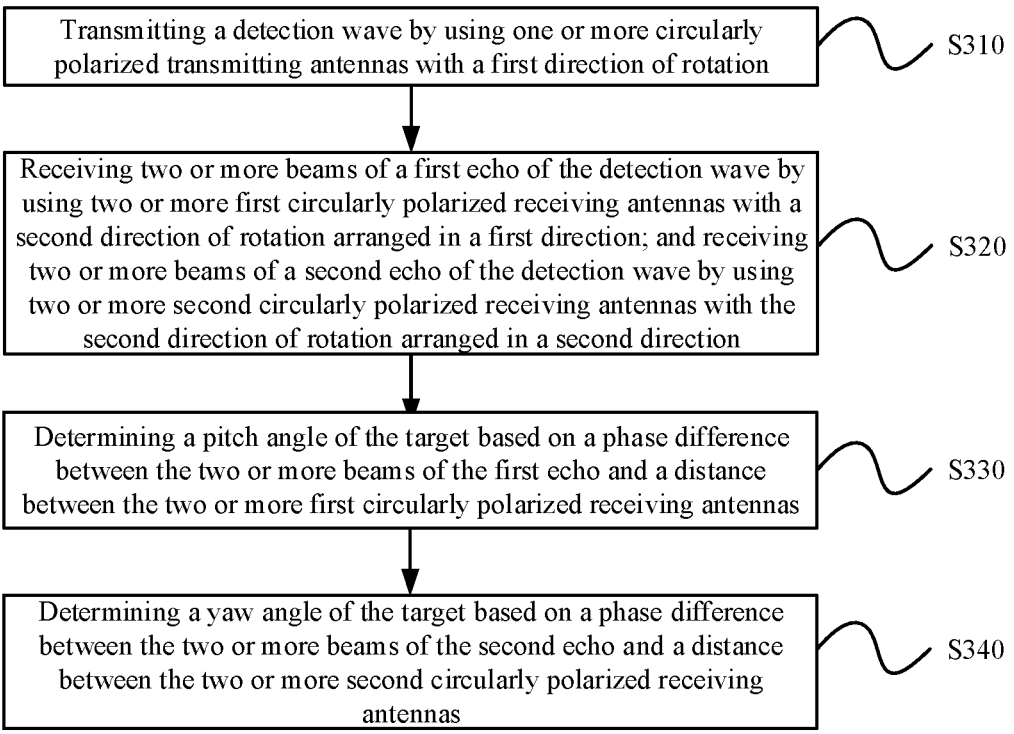
FIG. 3 is a schematic diagram of a method for positioning a target according to an embodiment of the present disclosure.

FIG. 3 is a schematic diagram of a method 300 for positioning a target according to an embodiment of the present disclosure. The method 300 may be the two-dimensional antenna system 200 based on the embodiments of the present disclosure. The method 300 is described in more detail below.

S310, transmitting a detection wave by using one or more circularly polarized transmitting antennas with a first direction of rotation. For example, using the transmitting antenna array 210 to transmit the detection wave.

S320, receiving two or more beams of a first echo of the detection wave by using two or more first circularly polarized receiving antennas with a second direction of rotation arranged in a first direction; and receiving two or more beams of a second echo of the detection wave by using two or more second circularly polarized receiving antennas with the second direction of rotation arranged in a second direction. For example, the echoes of the detection wave may be respectively received by the first circularly polarized receiving antenna and the second circularly polarized receiving antenna of the receiving antenna array 220. In particular, the first direction may be perpendicular to the second direction, and the first direction of rotation may be opposite to the second direction of rotation.

S330, determining a pitch angle of the target based on a phase difference between the two or more beams of the first echo and a distance between the two or more first circularly polarized receiving antennas.

S340, determining a yaw angle of the target based on a phase difference between the two or more beams of the second echo and a distance between the two or more second circularly polarized receiving antennas.

The method of positioning a target provided by the embodiments of the present disclosure uses the circularly polarized transmitting antennas to transmit a detection wave, and the circularly polarized receiving antennas arranged perpendicular to each other to receive an echo. As such, two-dimensional detection of the yaw and pitch angles of the target may be realized and reference information for the obstacle avoidance of the aircraft may be provided.

In one embodiment, the first direction of rotation may be a left-handed rotation and the second direction of rotation may be a right-handed rotation; or, in another embodiment, the first direction of rotation may be a right-handed rotation and the second direction of rotation may be a left-handed rotation.

In one embodiment, S310, transmitting a detection wave using one or more circularly polarized transmitting antennas with a first direction of rotation, may include: transmitting the detection wave by using two or more circularly polarized transmitting antennas arranged in the first direction. In the present embodiment, one or more circularly polarized transmitting antennas may be used. As such, the beam of the detection wave may have a certain width, which makes the scanning easier.

To adapt to the changes in the attitude of the aircraft and adjusting the direction of the detection wave transmitting by the circularly polarized transmitting antennas in the first direction, the first direction may be a vertical direction. Further, using two or more circularly polarized transmitting antennas arranged in the first direction to transmit the detection wave may include: adjusting a direction of the detection wave in the pitch direction by using two or more circularly polarized transmitting antennas arranged in the vertical direction. In addition, it may also be possible to control a beam direction of the detection wave by adjusting the excitation phase of each antenna (or it may be referred to as an antenna unit) to suit the attitude of the aircraft.

In one embodiment, S330, determining a pitch angle of the target based on a phase difference between the two or more beams of the first echo and a distance between the two or more first circularly polarized receiving antennas, may include: determining the pitch angle of the target by using a double-channel angle measurement method based on the phase difference between the two or more beams of the first echo and the distance between the two or more first circularly polarized receiving antennas. Further, S340, determining a yaw angle of the target based on a phase difference between the two or more beams of the second echo and a distance between the two or more second circularly polarized receiving antennas, may include: determining the yaw angle of the target using the double-channel angle measurement method based on the phase difference between the two or more beams of the second echo and the distance between the two or more second circularly polarized receiving antennas. A specific method of determining the pitch and yaw angles of the target using the double-channel angle measurement method will be described below.

It should be understood that, in addition to the double-channel angle measurement method, the pitch angle and/or the yaw angle of the target may be determined by methods such as the Digital Beam Forming ((DBF) method, which is not limited in the embodiments of the present disclosure.

In a specific example, the method of positioning a target provided in the embodiments of the present disclosure may be based on the two-dimensional antenna system shown in FIG. 2. The transmitting antenna array 210 may include a circularly polarized transmitting antenna 212 and a circularly polarized transmitting antenna 214 arranged in a vertical direction for transmitting the detection wave. The receiving antenna array 220 may include two first circularly polarized receiving antennas of the first circularly polarized receiving antenna 222 and the first circularly polarized receiving antenna 224 arranged in the vertical direction to receive the two beams of the first echo of the detection wave through the two first circularly polarized receiving antennas. The receiving antenna array 220 may further include two second circularly polarized receiving antennas of the second circularly polarized receiving antenna 226 and the second circularly polarized receiving antenna 228 arranged in the horizontal direction to receive the two beams of the first echo of the detection wave through the two second circularly polarized receiving antennas.

Figure 4:
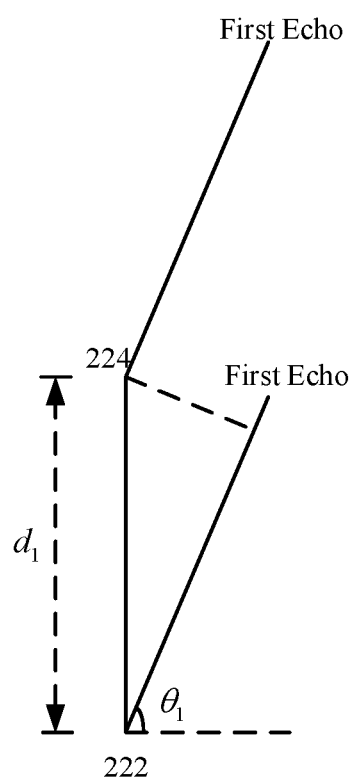
FIG. 4 is a schematic diagram of determining a pitch angle using a double-channel angle measurement method according to another embodiment of the present disclosure.

FIG. 4 is a schematic diagram of determining a pitch angle using a double-channel angle measurement method according to another embodiment of the present disclosure. As shown in FIG. 4, the distance between the first circularly polarized receiving antenna 222 and the first circularly polarized receiving antenna 224 may be $d_1$, the phase difference of the two beams of the first echo received by the first circularly polarized receiving antenna 222 and the first circularly polarized receiving antenna 224 may be $\varphi_1$, and the pitch angle of the target may be $\theta_1$. The pitch angle of the target may be determined based on the following formula:

$$\varphi_1 = \frac{2\pi d_1 \sin\theta_1}{\lambda},$$

where $\lambda$ maybe the wavelength of the detection wave.

Figure 5:
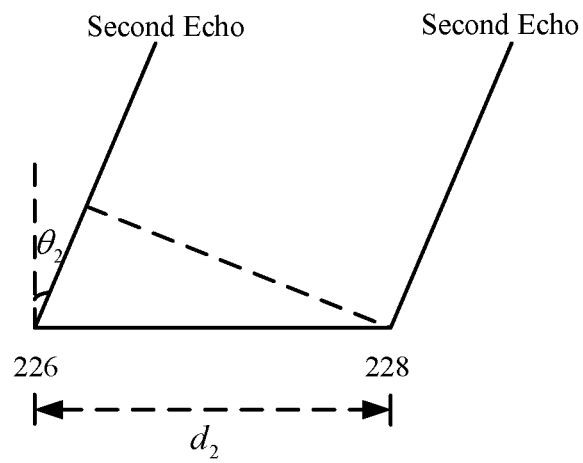
FIG. 5 is a schematic diagram of determining a yaw angle using a double-channel angle measurement method according to another embodiment of the present disclosure.

FIG. 5 is a schematic diagram of determining a yaw angle using a double-channel angle measurement method according to another embodiment of the present disclosure. As shown in FIG. 5, the distance between the second circularly polarized receiving antenna 226 and the second circularly polarized receiving antenna 228 may be $d_2$, the phase difference of the two beams of the second echo received by the second circularly polarized receiving antenna 226 and the second circularly polarized receiving antenna 228 may be $\varphi_2$, and the yaw angle of the target may be $\theta_2$. The yaw angle of the target may be determined based on the following formula:

$$\varphi_2 = \frac{2\pi d_2 \sin\theta_2}{\lambda},$$

where $\lambda$ maybe the wavelength of the detection wave.

It should be understood that when the receiving antenna array 220 includes more first circularly polarized receiving antennas, a plurality of pitch angles may be obtained based on the first echo received by every two of the first circularly polarized receiving antennas, and an average or a weighted average of the pitch angles may be calculated. Similarly, when the receiving antenna array 220 includes more second circularly polarized receiving antennas, a plurality of yaw angles may be obtained based on the second echo received by every two of the second circularly polarized receiving antennas, and an average or a weighted average of the yaw angles may be calculated.

It should also be understood that for a detection wave, an echo may be generated after the detection wave is reflected by the target, and there may be no difference in the nature of each beam of echo. For ease of description and differentiation, the echo received by the first circularly polarized receiving antenna may be referred to as a first echo and the echo received by the second circularly polarized receiving antenna may be referred to as a second echo, which is not a limitation to the embodiments of the present disclosure.

In one embodiment, the method 300 may further include: determining a distance of the target based on the detection wave and one or more beams of echo of the two or more beams of the first echo and the two or more beams of the second echo; and obtaining position information of the target based on the pitch angle, the yaw angle, and the distance.

More specifically, the distance of the target may be calculated using the Frequency Modulated Continuous Wave (FMCW) distance detection principle. The principle is to transmit a detection wave of varying frequencies (which may be continuous or stepped, linear or nonlinear) to a target, such as a high-frequency continuous wave whose frequency may vary with time based on the triangular wave pattern. The varying pattern of the frequency of the received echo may be the same as the frequency of the detection wave, which may be a triangular wave pattern with a delay. Subsequently, the distance of the target may be calculated by using the delay. In a linear FMCW distance detection, a simple method may be to mix the echo with the detection wave to obtain an Intermediate Frequency (IF) signal. Each IF frequency may correspond to a delay, and the distance of the target may be calculated by using the delay.

The spherical coordinates formed by the pitch angle, the yaw angle, and the distance may determine the position information of the target. Alternatively, the spherical coordinates formed by the pitch angle, the yaw angle, and the distance may be converted into the rectangular coordinates to obtain the position information of the target.

In one embodiment, the method 300 may be performed periodically and a plurality of position information of the target within a plurality of cycles may be obtained, thereby enabling the tracking of the target.

Figure 6:
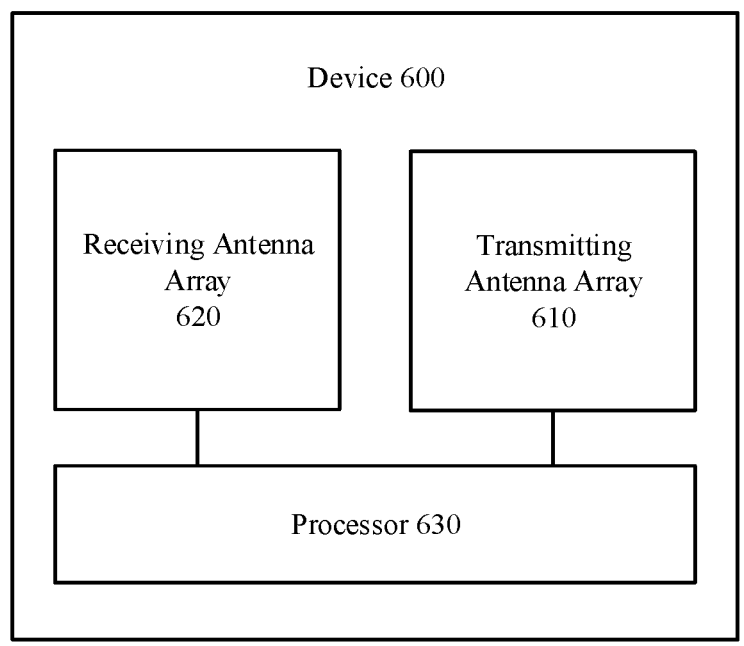
FIG. 6 is a schematic block diagram of a device for positioning a target according to an embodiment of the present disclosure.

Based on the two-dimensional antenna system 200 and the method 300 for positioning a target, the embodiments of the present disclosure further provides a device for positioning a target. FIG. 6 is a schematic block diagram of a device 600 for positioning a target according to an embodiment of the present disclosure. The device 600 may include a transmitting antenna array 610, a receiving antenna array 620, and one or more processors 630. The transmitting antenna array 610 may include one or more circularly polarized transmitting antennas with a first direction of rotation for transmitting a detection wave. The receiving antenna array 620 may include two or more first circularly polarized receiving antennas. The two or more first circularly polarized receiving antennas may be antennas with a second direction of rotation arranged in a first direction for receiving two or more beams of a first echo of the detection wave. The receiving antenna array 620 may further include two or more second circularly polarized receiving antennas. The two or more second circularly polarized receiving antennas may be antennas with the second direction of rotation arranged in a second direction for receiving two or more beams of a second echo of the detection wave. In particular, the first direction may be perpendicular to the second direction, and the first direction of rotation may be opposite to the second direction of rotation. The one or more processors 630 may be used to determine a pitch angle of the target based on a phase difference between the two or more beams of the first echo and a distance between the two or more first circularly polarized receiving antennas. The one or more processors 630 may further be used to determine a yaw angle of the target based on a phase difference between the two or more beams of the second echo and a distance between the two or more second circularly polarized receiving antennas.

The device for positioning a target provided by the embodiments of the present disclosure uses the circularly polarized transmitting antennas to transmit a detection wave, and the circularly polarized receiving antennas arranged perpendicular to each other to receive an echo. As such, two-dimensional detection of the yaw and pitch angles of the target may be realized and reference information for the obstacle avoidance of the aircraft may be provided.

Further, the transmitting antenna array 610 may correspond to the transmitting antenna array 210 of the two-dimensional antenna system 200, and the receiving antenna array 620 may correspond to the receiving antenna array 220 of the two-dimensional antenna system 200. The one or more processors 630 may work together or separately. The one or more processors 630 may include a radio frequency module and a computing module. The computing module may be used to compute the pitch angle and the yaw angle. The radio frequency module may further include a transmitter for generating a detection wave and a receiver for demodulating the echo.

The device 600 of the embodiments of the present disclosure may be mounted on an UAV. Alternatively, the transmitting antenna array 610, the receiving antenna array 620, and the radio frequency module of the one or more processors 630 may be mounted on the UAV, and the computing module of the one or more processors 630 may be disposed on the ground, which is not limited in the embodiments of the present disclosure. Each of the transmitting antennas of the transmitting antenna array 610 may respectively correspond to one transmitter, or multiple transmitting antennas may jointly correspond to the same transmitter. Similarly, each receiving antenna of the receiving antenna array 620 may respectively correspond to one receiver, or multiple receiving antennas may jointly correspond to the same receiver. The number of the transmitter and the receiver, and the deployment manner are not limited in the embodiments of the present disclosure.

In one embodiment, corresponding to the two-dimensional antenna system 200 and the method 300 for positioning a target, the transmitting antenna array may include two or more circularly polarized transmit antennas arranged in the first direction.

When an aircraft is in flight, the aircraft may be travelling in high speed with frequent changes in the attitude. To adapt to the changes in the attitude of the aircraft, in one embodiment, the first direction may be a vertical direction. The transmitting antenna array may be specifically used to adjust the direction of the detection wave in the pitch direction by using the two or more circularly polarized transmitting antennas arranged in the vertical direction. In addition, it may also be possible to control a beam direction of the detection wave by adjusting the excitation phase of each antenna (or it may be referred to as an antenna unit) to suit the attitude of the aircraft.

In one embodiment, the first direction of rotation may be a left-handed rotation and the second direction of rotation may be a right-handed rotation; or, in another embodiment, the first direction of rotation may be a right-handed rotation and the second direction of rotation may be a left-handed rotation.

In one embodiment, the one or more processors 630 may be used to determine the pitch angle of the target by using the double-channel angle measurement method based on the phase difference between the two or more beams of the first echo and the distance between the two or more first circularly polarized receiving antennas. Further, the one or more processors 630 may be used to determine the yaw angle of the target by using the double-channel angle measurement method based on the phase difference between the two or more beams of the second echo and the distance between the two or more second circularly polarized receiving antennas.

In one embodiment, the one or more processors 630 may be further used to determine a distance of the target based on the detection wave and one or more of the two or more beams of the first echo and the two or more beams of the second echo; and obtain position information of the target based on the pitch angle, the yaw angle, and the distance.

In one embodiment, the one or more processors 630 may further be used to periodically obtain a plurality of position information of the target.

Figure 7:
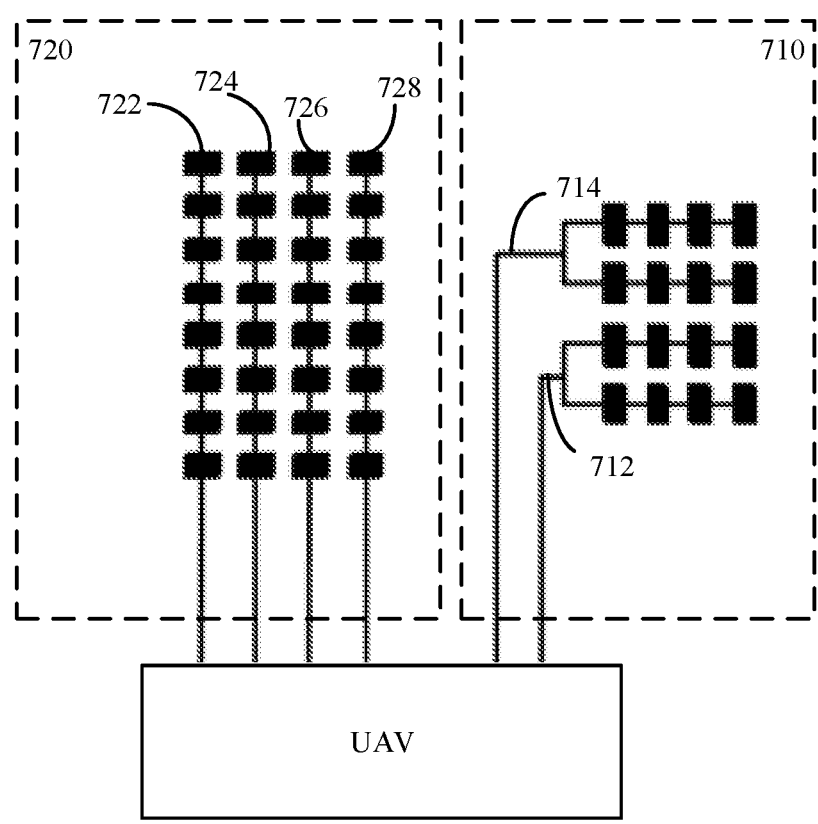
FIG. 7 is a schematic diagram of a two-dimensional antenna system according to another embodiment of the present disclosure.

An embodiment of the present disclosure provides another two-dimensional antenna system. Similarly, the two-dimensional antenna system may be used on an aircraft, particularly on an UAV. The two-dimensional antenna system may be disposed at the top of the aircraft (e.g., at the top of the UAV 110) or elsewhere for positioning the aircraft. FIG. 7 is a schematic diagram of a two-dimensional antenna system 700 according to another embodiment of the present disclosure.

As shown in FIG. 7, the two-dimensional antenna system 700 may include a transmitting antenna array 710 and a receiving antenna array 720. The transmitting antenna array 710 may include a first circularly polarized transmitting antenna 712 with a first direction of rotation and a second circularly polarized transmitting antenna 714 with the first direction of rotation arranged in a first direction. The receiving antenna array 720 may include a first circularly polarized receiving antenna with a second direction of rotation and a second circularly polarized receiving antenna 714 with the second direction of rotation arranged in a second direction. The receiving antenna array 720 may further include more circularly polarized receive antennas. For example, FIG. 7 illustrates a circularly polarized receiving antenna 722, a circularly polarized receiving antenna 724, a circularly polarized receiving antenna 726, and a circularly polarized receiving antenna 728. The circularly polarized receiving antenna 722 may be considered as the first circularly polarized receiving antenna, and the circularly polarized receiving antenna 724 may be considered as the second circularly polarized receiving antenna. In particular, the first direction may be perpendicular to the second direction, and the first direction of rotation may be opposite to the second direction of rotation.

In the two-dimensional antenna system of the embodiment of the present disclosure, the transmitting antenna array 710 may be used to transmit a detection wave, and the detection wave may generate an echo after being reflected by the target. Since the electromagnetic wave transmitted by the circularly polarized transmitting antenna has a direction of rotation, the rotation direction of the electromagnetic wave may be reversed after a single reflection of the target, and it may be necessary to use a circularly polarized receiving antenna with an opposite rotation direction for reception. Therefore, the embodiment of the present disclosure utilizes the characteristics of the circularly polarized antenna mentioned above, such that the transmitting antenna and the receiving antenna may have opposite directions of rotation, which may increase the isolation between the antennas, and may effectively improve the signal-to-noise ratio of the received echo signal.

More specifically, in one embodiment, the first direction of rotation may be a left-handed rotation and the second direction of rotation may be a right-handed rotation; or, in another embodiment, the first direction of rotation may be a right-handed rotation and the second direction of rotation may be a left-handed rotation.

When an aircraft is in flight, the aircraft may be travelling in high speed with frequent changes in the attitude. To adapt to the changes in the attitude of the aircraft, in one embodiment, the first direction may be a vertical direction and the second direction may be a horizontal direction. The transmitting antenna array 710 may include two or more circularly polarized transmitting antennas. The two or more circularly polarized transmitting antennas may be arranged in the first direction for adjusting the direction of the detection wave transmitting by the circularly polarized transmitting antennas in the first direction. In addition, it may also be possible to control a beam direction of the detection wave by adjusting the excitation phase of each antenna (or it may be referred to as an antenna unit) to suit the attitude of the aircraft.

It should be understood that the vertical direction may be a direction of perpendicular to the horizontal direction. When the aircraft is flying horizontally, the arrangement direction of the two or more first circularly polarized receiving antennas may be an approximate direction of gravity.

In the specific embodiment illustrated in FIG. 7, the transmitting antenna array 710 may include two circularly polarized transmitting antennas of the first circularly polarized transmitting antenna 712 and the first circularly polarized transmitting antenna 714 arranged in the vertical direction. The receiving antenna array 720 may include four circularly polarized receiving antennas of the circularly polarized receiving antenna 722, the circularly polarized receiving antenna 724, the circularly polarized receiving antenna 726, and the circularly polarized receiving antenna 728 arranged in the horizontal direction.

It should be understood that the number of the circularly polarized transmitting antennas, first circularly polarized receiving antennas, and second circularly polarized receiving antennas in FIG. 7 is merely for illustrative purpose. The number of the circularly polarized transmitting antenna may be more than two, and the number of the circularly polarized receiving antennas may be two, three, or more than four, which are not limited in the embodiments of the present disclosure.

It should also be understood that the specific structure of each antenna may be determined based on the scanning range and the power. The specific structures of the antenna are not limited in the embodiments of the present disclosure.

The use of the two-dimensional antenna system 700 to position a target will be described in detail below in a method 800 for positioning a target.

Figure 8:
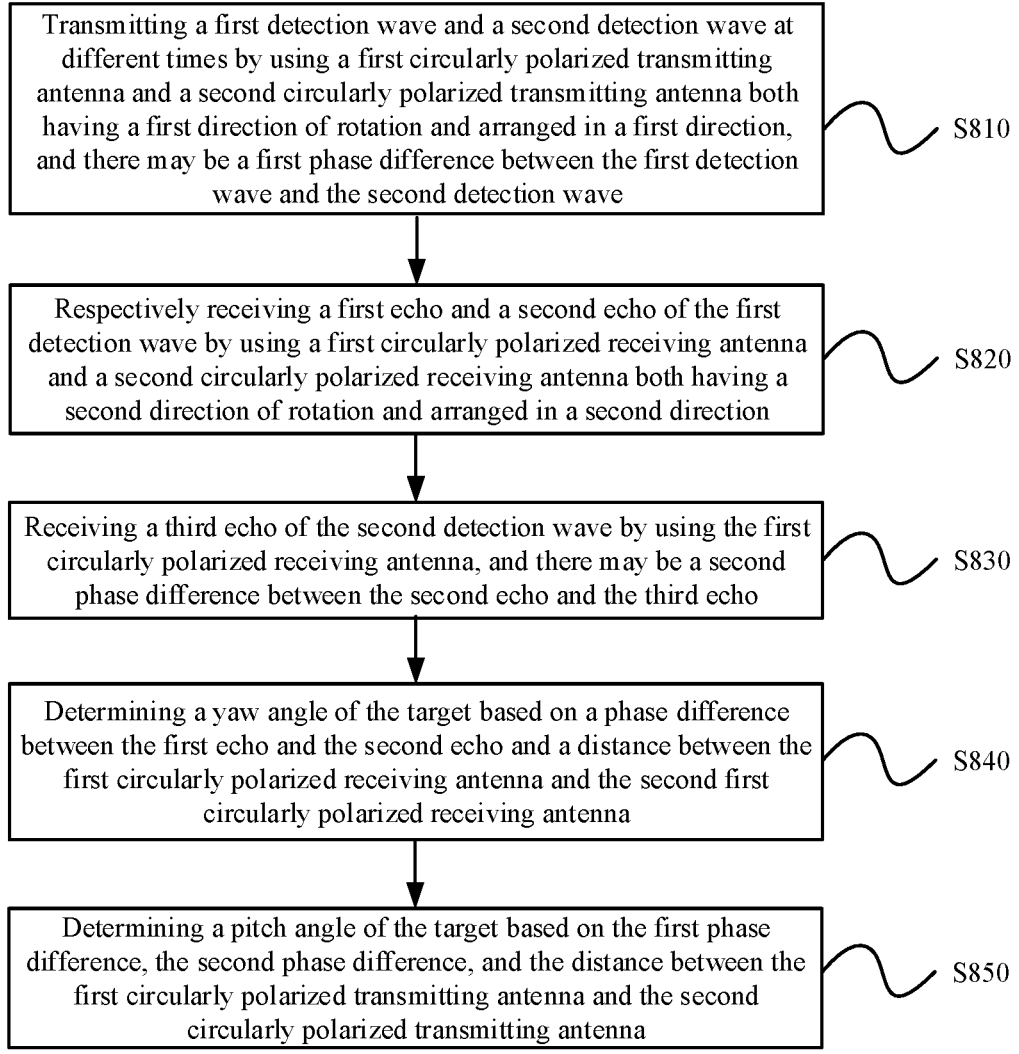
FIG. 8 is a schematic diagram of a method for positioning a target according to another embodiment of the present disclosure.

FIG. 8 is a schematic diagram of the method 800 for positioning a target according to another embodiment of the present disclosure. The method 800 may be the two-dimensional antenna system 700 based on the embodiments of the present disclosure. The method is described in more detail below.

S810, transmitting a first detection wave and a second detection wave at different times by using a first circularly polarized transmitting antenna and a second circularly polarized transmitting antenna both having a first direction of rotation and arranged in a first direction, and there may be a first phase difference between the first detection wave and the second detection wave. For example, the first detection wave and the second detection wave may be transmitted at different times by the two or more circularly polarized transmitting antennas in the transmitting antenna array 710.

S820, respectively receiving a first echo and a second echo of the first detection wave by using a first circularly polarized receiving antenna and a second circularly polarized receiving antenna both having a second direction of rotation and arranged in a second direction. In particular, the first direction may be perpendicular to the second direction, and the first direction of rotation may be opposite to the second direction of rotation. For example, the receiving antenna array 720 may include a first circularly polarized receiving antenna and a second circularly polarized receiving antenna, and may receive two or more beams of echo of the first detection wave through the receiving antenna array 720.

S830, receiving a third echo of the second detection wave by using the first circularly polarized receiving antenna, and there may be a second phase difference between the second echo and the third echo.

S840, determining a yaw angle of the target based on a phase difference between the first echo and the second echo and a distance between the first circularly polarized receiving antenna and the second first circularly polarized receiving antenna. For example, determine a yaw angle of the target based on the phases of the two or more beams of echo of the first detection wave received by the receiving antenna array 720 and the distance between the antennas in the receiving antenna array 720.

S850, determining a pitch angle of the target based on the first phase difference, the second phase difference, and the distance between the first circularly polarized transmitting antenna and the second circularly polarized transmitting antenna.

The method of positioning a target provided by the embodiments of the present disclosure uses a plurality of circularly polarized transmitting antennas to transmit detection waves, and the circularly polarized receiving antennas arranged perpendicular to the plurality of circularly polarized transmitting antennas to receive echoes. As such, two-dimensional detection of the yaw and pitch angles of the target may be realized and reference information for the obstacle avoidance of the aircraft may be provided.

In one embodiment, the first direction of rotation may be a left-handed rotation and the second direction of rotation may be a right-handed rotation; or, in another embodiment, the first direction of rotation may be a right-handed rotation and the second direction of rotation may be a left-handed rotation.

To adapt to the changes in the attitude of the aircraft and adjusting the direction of the detection wave transmitting by the circularly polarized transmitting antennas in the first direction, the first direction may be a vertical direction. In S810, transmitting a first detection wave and a second detection wave at different times by using a first circularly polarized transmitting antenna and a second circularly polarized transmitting antenna both having a first direction of rotation and arranged in a first direction may include: using the first circularly polarized transmitting antenna and the second circularly polarized transmitting antenna arranged in the vertical direction to control the direction of a transmission beam to transmit the first detection wave and the second detection wave at different times.

In one embodiment, S810, transmitting a first detection wave and a second detection wave at different times by using a first circularly polarized transmitting antenna and a second circularly polarized transmitting antenna both having a first direction of rotation and arranged in a first direction, may include: transmitting the first detection wave by using the first circularly polarized transmitting antenna at a first time, and transmitting the second detection wave by using the first circularly polarized transmitting antenna at a second time.

S840, determining a yaw angle of the target based on a phase difference between the first echo and the second echo and a distance between the first circularly polarized receiving antenna and the second first circularly polarized receiving antenna, may include: determining the yaw angle of the target by using the double-channel angle measure method based on the phase difference between the first echo and the second echo and the distance between the first circularly polarized receiving antenna and the second first circularly polarized receiving antenna. In other words, the yaw angle of the target may be determined based on the phases of the two or more beams of echo of the first detection wave received by the receiving antenna array 720 and the distance between the antennas in the receiving antenna array 720. More specifically, the yaw angle of the target may be determined by using the double-channel angle measure method based on the phase difference between any two beams of echo of the two or more beams of echo of the first detection wave and the distance between the two circularly polarized receiving antennas that received the any two beams of echo.

S850, determining a pitch angle of the target based on the first phase difference, the second phase difference, and the distance between the first circularly polarized transmitting antenna and the second circularly polarized transmitting antenna, may include: using the following formula to determine the pitch angle $\Theta_1$:

$$\Gamma_1 - \Gamma_2 = \frac{2\pi D_1 \sin\Theta_1}{\lambda},$$

where $\Gamma_1$ maybe the first phase difference, $\Gamma_2$ may be the second phase difference, $D_1$ may be the distance between the first circularly polarized transmitting antenna and the second circularly polarized transmitting antenna, $\Theta_1$ may be the pitch angle, and $\lambda$ may be the wavelength of the first detection wave and the second detection wave.

It should be understood that, in addition to the double-channel angle measurement method, the yaw angle of the target may be determined by methods such as the Digital Beam Forming ((DBF) method, which is not limited in the embodiments of the present disclosure.

In a specific example, the method of positioning a target provided in the embodiments of the present disclosure may be based on the two-dimensional antenna system shown in FIG. 7. The transmitting antenna array 710 may include the first circularly polarized transmitting antenna 712 to transmit the first detection wave and the second circularly polarized transmitting antenna 714 to transmit the second detection wave. The first and second circularly polarized transmitting antennas may be arranged in the vertical direction and the first phase difference may be between the first detection wave and the second detection wave. The receiving antenna array 720 may include the first circularly polarized receiving antenna 722 and the second circularly polarized receiving antenna 724 to respectively receive the first echo and the second echo of the first detection wave. The first circularly polarized receiving antenna 722 may be used to receive the first echo of the first detection wave and the third echo of the second detection wave, and the second phase difference may be between the first echo and the third echo.

Determining the yaw angle of the target may also be similar to FIG. 4 and FIG. 5, which may be based on the phase difference between the first echo and the second echo of the first detection wave and the distance between the first circularly polarized receiving antenna 722 and the second circularly polarized receiving antenna 724. Of course, the yaw angle of the target may also be determined by methods such as the DBF method, and will not be described here.

Figure 9:
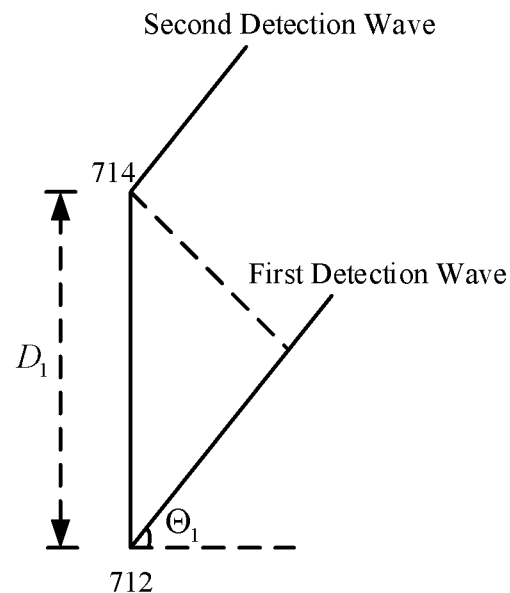
FIG. 9 is a schematic diagram of determining a pitch angle according to another embodiment of the present disclosure.

FIG. 9 is a schematic diagram of determining a pitch angle according to another embodiment of the present disclosure. At the first time, the first circularly polarized transmitting antenna 712 may transmit the first detection wave; and at the second time, the second circularly polarized transmitting antenna 714 may transmit the second detection wave. Since the first circularly polarized transmitting antenna 712 and the second circularly polarized transmitting antenna 714 may not work at the same time, the two transmitting antennas may share one radio frequency circuit, thereby simplifying the related structure of the aircraft. Further, the time difference between the first time and the second time may cause the first phase difference $\Gamma_1$ between the first detection wave and the second detection wave.

Any one of the circularly polarized receiving antenna in the receiving antenna array 720 (e.g., the first circularly polarized receiving antenna 722) may respectively receive the first echo of the first detection wave and the third echo of the second detection wave. The second phase difference $\Gamma_2$ may be between the first echo and the third echo. The second phase difference $\Gamma_2$ may be partially caused by the first phase difference $\Gamma_1$ and partially caused by the distance between the first circularly polarized transmitting antenna 712 and the second circularly polarized transmitting antenna 714. Therefore, the phase difference caused by the distance between the first circularly polarized transmitting antenna 712 and the second circularly polarized transmitting antenna 714 may be $\Gamma_1-\Gamma_2$. Assuming the pitch angle of the target is $\Theta_1$, it may be known based on the triangle shown in FIG. 9 that $$\Gamma_1 - \Gamma_2 = \frac{2\pi D_1 \sin\Theta_1}{\lambda},$$

where $\lambda$ may be the wavelength of the first detection wave and the second detection wave, and the pitch angle $\Theta_1$ may be obtained based on the formula above.

It should be understood that a plurality of pitch angles may be calculated based on the echoes of the two detection waves having phases difference received by each of the circularly polarized receiving antenna in the receiving antenna array 720, and an average or weighted average of the pitch angles may be calculated.

It should also be understood that for a detection wave, an echo may be generated after the detection wave is reflected by the target, and there may be no difference in the nature of each beam of echo. For ease of description and differentiation, corresponding to the first detection wave, the echo received by the first circularly polarized receiving antenna may be referred to as the first echo; corresponding to the second detection wave, the echo received by the second circularly polarized receiving antenna may be referred to as the second echo, which is not a limitation to the embodiments of the present disclosure.

In one embodiment, the method 800 may further include: determining a distance of the target based on one or more of the first detection wave and the second detection wave, and one or more of the first echo, the second echo, and the third echo; and obtaining position information of the target based on the pitch angle, the yaw angle, and the distance.

More specifically, the distance of the target may be calculated by using the FMCW distance detection principle, and details are not described herein again.

The spherical coordinates formed by the pitch angle, the yaw angle, and the distance may determine the position information of the target. Alternatively, the spherical coordinates formed by the pitch angle, the yaw angle, and the distance may be converted into the rectangular coordinates to obtain the position information of the target.

In one embodiment, the method 800 may be performed periodically and a plurality of position information of the target within a plurality of cycles may be obtained, thereby enabling the tracking of the target.

Figure 10:
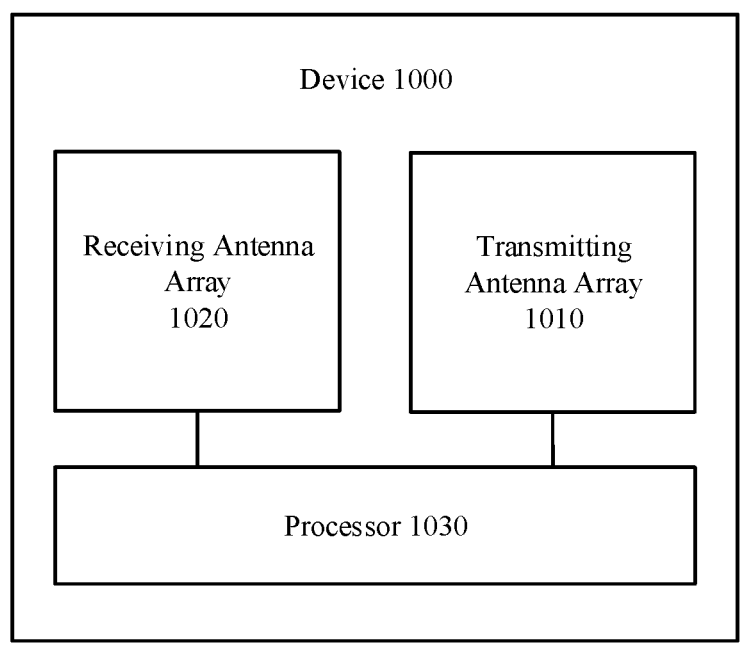
FIG. 10 is a schematic block diagram of a device for positioning a target according to another embodiment of the present disclosure.

Based on the two-dimensional antenna system 700 and the method 800 of positioning a target, the embodiments of the present disclosure further provides a device for positioning a target. FIG. 10 is a schematic block diagram of a device 1000 for positioning a target according to another embodiment of the present disclosure. The device 1000 may include a transmitting antenna array 1010, a receiving antenna array 1020, and one or more processors 1030. The transmitting antenna array 1010 may include a first circularly polarized transmitting antenna. The first circularly polarized transmitting antenna may be an antenna having a first direction of rotation and may be used to transmit a first detection wave. The transmitting antenna array 1010 may further include a second circularly polarized transmitting antenna. The second circularly polarized transmitting antenna may be an antenna having the first direction of rotation and may be used to transmit a second detection wave. In particular, the first circularly polarized transmitting antenna and the second circularly polarized transmitting antenna may be arranged in a first direction, and there may be a first phase difference between the first detection wave and the second detection wave.

The receiving antenna array 1020 may include a first circularly polarized receiving antenna. The first circularly polarized receiving antenna may be an antenna having a second direction of rotation and may be used to receive a first echo of the first detection wave and a third echo of the second detection wave, and there may be a second phase difference between the first echo and the third echo. The receiving antenna array 1020 may further include a second circularly polarized receiving antenna. The second circularly polarized receiving antenna may be an antenna having the second direction of rotation and may be used to receive a second echo of the first detection wave. The first circularly polarized receiving antenna and the second circularly polarized receiving antenna may be arranged in a second direction, the first direction may be perpendicular to the second direction, and the first direction of rotation may be opposite to the second direction of rotation.

The one or more processors 1030 may be used to determine a yaw angle of the target based on a phase difference between the first echo and the second echo and a distance between the first circularly polarized receiving antenna and the second first circularly polarized receiving antenna. The one or more processors 1030 may further be used to determine a pitch angle of the target based on the first phase difference, the second phase difference, and the distance between the first circularly polarized transmitting antenna and the second circularly polarized transmitting antenna.

The device for positioning a target provided by the embodiments of the present disclosure uses a plurality of circularly polarized transmitting antennas to transmit detection waves, and the circularly polarized receiving antennas arranged perpendicular to the plurality of circularly polarized transmitting antennas to receive echoes. As such, two-dimensional detection of the yaw and pitch angles of the target may be realized and reference information for the obstacle avoidance of the aircraft may be provided.

Further, the transmitting antenna array 1010 may correspond to the transmitting antenna array 710 of the two-dimensional antenna system 700, and the receiving antenna array 1020 may correspond to the receiving antenna array 720 of the two-dimensional antenna system 700. The one or more processors 1030 may work together or separately. The one or more processors 1030 may include a radio frequency module and a computing module. The computing module may be used to compute the pitch angle and the yaw angle. The radio frequency module may further include a transmitter for generating a detection wave and a receiver for demodulating the echo.

The device 1000 of the embodiments of the present disclosure may be mounted on an UAV. Alternatively, the transmitting antenna array 1010, the receiving antenna array 1020, and the radio frequency module of the one or more processors 1030 may be mounted on the UAV, and the computing module of the one or more processors 1030 may be disposed on the ground, which is not limited in the embodiments of the present disclosure. Each of the transmitting antennas of the transmitting antenna array 1010 may respectively correspond to one transmitter, or multiple transmitting antennas may jointly correspond to the same transmitter. Similarly, each receiving antenna of the receiving antenna array 1020 may respectively correspond to one receiver, or multiple receiving antennas may jointly correspond to the same receiver. The number of the transmitter and the receiver, and the deployment manner are not limited in the embodiments of the present disclosure.

In one embodiment, the first direction may be a vertical direction, and the transmitting antenna array 1010 may be specifically configured to use the first circularly polarized transmitting antenna and the second circularly polarized transmitting antenna arranged in the vertical direction to control the direction of a transmission beam to transmit the first detection wave and the second detection wave at different times.

In one embodiment, the first direction of rotation may be a left-handed rotation and the second direction of rotation may be a right-handed rotation; or, in another embodiment, the first direction of rotation may be a right-handed rotation and the second direction of rotation may be a left-handed rotation.

In one embodiment, the transmitting antenna array 1010 may be specifically configured to use the first circularly polarized transmitting antenna to transmit the first detection wave at a first time; and use the second circularly polarized transmitting antenna to transmit the second detection wave at a second time. Further, $\Gamma_1$ maybe the first phase difference, $\Gamma_2$ may be the second phase difference, $D_1$ may be the distance between the first circularly polarized transmitting antenna and the second circularly polarized transmitting antenna, and $\Theta_1$ may be the pitch angle. The one or more processor 1030 may further be used to determine the yaw angle of the target by using the double-channel angle measurement method based on the phase difference between the first echo and the second echo and the distance between the first circularly polarized receiving antenna and the second circularly polarized receiving antenna. In addition, the one or more processor 1030 may further be used to determine the pitch angle of the target based on the following formula:

$$\Gamma_1 - \Gamma_2 = \frac{2\pi D_1 \sin\Theta_1}{\lambda},$$

where $\lambda$ may be the wavelength of the first detection wave and the second detection wave.

In one embodiment, the one or more processor 1030 may further be used to determine a distance of the target based on one or more of the first detection wave and the second detection wave, and one or more of the first echo, the second echo, and the third echo; and obtain position information of the target based on the pitch angle, the yaw angle, and the distance.

In one embodiment, the one or more processors 1030 may also be used to periodically obtain a plurality of position information of the target.

It should be understood that "an embodiment" or "one embodiment" mentioned in the disclosure means that specific features, structures, or properties related to an embodiment is included in at least one embodiment of the present disclosure. Therefore, "in an embodiment" or "in one embodiment" in the whole disclosure not necessarily refers to a same embodiment. In addition, these specific features, structures, or properties may be combined in one or more embodiments in any proper manner.

It should be understood that, in various embodiments of the present disclosure, values of sequence numbers of the foregoing processes do not indicate execution sequences, and the execution sequence of each process should be determined according to a function and inherent logic thereof, but should not form any limit to implementation processes of the embodiments of the present disclosure.

It should be understood that in the embodiments of the present disclosure, "B corresponding to A" indicates that B is associated with A, and B may be determined according to A. However, it should further be understood that determining B according to A does not mean that B is determined only according to A, and B may also be determined according to A and/or other information.

It should be understood that in this specification, a term "and/or" is only an associative relationship for describing associated objects, indicating that three relationships may exist, for example, A and/or B, which may indicate three situations: A exists independently; A and B exist simultaneously; and B exists independently. In addition, in this specification, a character "/" generally indicates a "or" relationship between a former and a later associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A two-dimensional antenna system, comprising:
 a transmitting antenna array configured to transmitting a detection wave including:
   one or more circularly polarized transmitting antennas having a first direction of rotation; and
 a receiving antenna array including:
   two or more first circularly polarized receiving antennas having a second direction of rotation arranged in a first direction, the two or more first circularly polarized receiving antennas being configured to receive two or more beams of a first echo of the detection wave, wherein a phase difference between the two or more beams of the first echo and a distance between the two or more first circularly polarized receiving antennas are used to determine a pitch angle of a target; and
   two or more second circularly polarized receiving antennas having the second direction of rotation arranged in a second direction, the first direction being perpendicular to the second direction, the first direction of rotation being opposite to the second direction of rotation, and the two or more second circularly polarized receiving antennas being configured to receive two or more beams of a second echo of the detection wave, wherein a phase difference between the two or more beams of the second echo and a distance between the two or more second circularly polarized receiving antennas are used to determine a yaw angle of the target.

2. The system of claim 1, wherein the transmitting antenna array includes two or more of the circularly polarized transmitting antennas, and the circularly polarized transmitting antennas are arranged in the first direction.

3. The system of claim 1, wherein the first direction of rotation is a left-handed rotation and the second direction of rotation is a right-handed rotation; or the first direction of rotation is the right-handed rotation and the second direction of rotation is the left-handed rotation.

4. The system of claim 1, wherein the first direction is a vertical direction.

5. The system of claim 1, wherein the transmitting antenna array includes two circularly polarized transmitting antennas arranged in a vertical direction; and the receiving antenna array includes two first circularly polarized receiving antennas arranged in the vertical direction, and two second circularly polarized antennas arranged in a horizontal direction.

6. A method of positioning a target, comprising:
 transmitting a detection wave by using one or more circularly polarized transmitting antennas having a first direction of rotation;
 receiving two or more beams of a first echo of the detection wave by using two or more first circularly polarized receiving antennas having a second direction of rotation arranged in a first direction;
 receiving two or more beams of a second echo of the detection wave by using two or more second circularly polarized receiving antennas having the second direction of rotation arranged in a second direction, wherein the first direction is perpendicular to the second direction, and the first direction of rotation is opposite to the second direction of rotation;
 determining a pitch angle of the target based on a phase difference between the two or more beams of the first echo and a distance between the two or more first circularly polarized receiving antennas; and
 determining a yaw angle of the target based on a phase difference between the two or more beams of the second echo and a distance between the two or more second circularly polarized receiving antennas.

7. The method of claim 6, wherein transmitting the detection wave using one or more circularly polarized transmitting antennas having the first direction of rotation includes: transmitting the detection wave by using two or more circularly polarized transmitting antennas arranged in the first direction.

8. The method of claim 7, wherein the first direction is a vertical direction, and transmitting the detection wave by using two or more circularly polarized transmitting antennas arranged in the first direction includes:
 adjusting a direction of the detection wave in a pitch direction by using two or more of the circularly polarized transmitting antennas arranged in the vertical direction.

9. The method of claim 6, wherein the first direction of rotation is a left-handed rotation and the second direction of rotation is a right-handed rotation; or the first direction of rotation is the right-handed rotation and the second direction of rotation is the left-handed rotation.

10. The method of claim 6, wherein determining the pitch angle of the target based on the phase difference between the two or more beams of the first echo and the distance between the two or more first circularly polarized receiving antennas includes:
   determining the pitch angle of the target by using a double-channel angle measurement method based on the phase difference between the two or more beams of the first echo and the distance between the two or more first circularly polarized receiving antennas; and,
   wherein determining the yaw angle of the target based on the phase difference between the two or more beams of the second echo and the distance between the two or more second circularly polarized receiving antennas includes:
   determining the yaw angle of the target by using the double-channel angle measurement method based on the phase difference between the two or more beams of the second echo and the distance between the two or more second circularly polarized receiving antennas.

11. The method of claim 6, further comprising:
   determining a distance of the target based on the detection wave and one or more beams of echoes, the one or more beams of echoes being from the two or more beams of the first echo and the two or more beams of the second echo; and
   obtaining position information of the target based on the pitch angle, the yaw angle, and the distance.

12. The method of claim 11, further comprising:
   performing the method periodically to obtaining a plurality of positional information of the target within a plurality of cycles.

13. A device for positioning a target, comprising:
   a transmitting antenna array, a receiving antenna array, and one or more processors;
   wherein the transmitting antenna array includes one or more circularly polarized transmitting antennas having a first direction of rotation for transmitting a detection wave;
   the receiving antenna array includes two or more first circularly polarized receiving antennas, the two or more first circularly polarized receiving antennas are antennas having a second direction of rotation arranged in a first direction for receiving two or more beams of a first echo of the detection wave; and two or more second circularly polarized receiving antennas, the two or more second circularly polarized receiving antennas are antennas having the second direction of rotation arranged in a second direction for receiving two or more beams of a second echo of the detection wave, the first direction being perpendicular to the second direction, and the first direction of rotation being opposite to the second direction of rotation; and
   the one or more processors are configured to determine a pitch angle of the target based on a phase difference between the two or more beams of the first echo and a distance between the two or more first circularly polarized receiving antennas, and to determine a yaw angle of the target based on a phase difference between the two or more beams of the second echo and a distance between the two or more second circularly polarized receiving antennas.

14. The device of claim 13, wherein the transmitting antenna array includes two or more of the circularly polarized transmitting antennas, and the circularly polarized transmitting antennas are arranged in the first direction.

15. The device of claim 14, wherein the first direction is a vertical direction and the transmitting antenna array is specifically configured to:
   adjust a direction of the detection wave in a pitch direction by using two or more of the circularly polarized transmitting antennas arranged in the vertical direction.

16. The method of claim 13, wherein the first direction of rotation is a left-handed rotation and the second direction of rotation is a right-handed rotation; or the first direction of rotation is the right-handed rotation and the second direction of rotation is the left-handed rotation.

17. The device of claim 13, wherein the one or more processors are configured to:
   determine the pitch angle of the target by using a double-channel angle measurement method based on the phase difference between the two or more beams of the first echo and the distance between the two or more first circularly polarized receiving antennas; and,
   determine the yaw angle of the target by using the double-channel angle measurement method based on the phase difference between the two or more beams of the second echo and the distance between the two or more second circularly polarized receiving antennas.

18. The device of claim 13, wherein the one or more processors are further configured to:
   determine a distance of the target based on the detection wave and one or more beams of echoes, the one or more beams of the echoes being from the two or more beams of the first echo and the two or more beams of the second echo; and
   obtain position information of the target based on the pitch angle, the yaw angle, and the distance.

19. The device of claim 18, wherein the one or more processors are further configured to periodically obtain a plurality of position information of the target.

20. The device of claim 13, wherein the device is mounted on an UAV.

* * * * *